United States Patent [19]

Conklin et al.

[11] 4,403,119

[45] * Sep. 6, 1983

[54] DTMF ACTIVATED REMOTE TELEPHONE LINE SWITCHING AND TESTING

[75] Inventors: Charles E. Conklin, Pleasant Valley; Duncan Bruce, Rhinebeck, both of N.Y.

[73] Assignee: Conklin Instrument Corporation, Pleasant Valley, N.Y.

[*] Notice: The portion of the term of this patent subsequent to Mar. 24, 1998, has been disclaimed.

[21] Appl. No.: 277,080

[22] Filed: Jun. 25, 1981

[51] Int. Cl.³ .......................... H04B 3/46; H04M 3/26
[52] U.S. Cl. ...................... 179/175.3 R; 179/175.2 R
[58] Field of Search ....... 179/175.3 R, 78 R, 175.2 R, 179/175.1 R, 175.2 C

[56] References Cited

U.S. PATENT DOCUMENTS

4,258,236 3/1981 Conklin et al. .............. 179/175.3 R

Primary Examiner—Stafford D. Schreyer
Attorney, Agent, or Firm—Bernard, Rothwell & Brown

[57] ABSTRACT

DTMF (dual-tone multi-frequency) activated apparatus for remote switching and testing of a four-wire telephone line system is disclosed. The telephone line provides four-wire service between a first location and a plurality of second remote locations. By using a standard twelve button or expanded sixteen button telephone DTMF key pad, the switching and testing apparatus provides the capability at the first location of controlling switching circuits at any one of the remote locations. Each remote switching and testing circuit is provided with a DTMF detector and digital logic responsive to the detector for recognizing an assigned address code and any one of the command codes corresponding to the looped mode, the terminated mode, the milliwatt source mode, and the in-data mode. A programmable three digit address, for example, allows use of up to one thousand switching and testing circuits on one line. When the digital logic of a switching and testing circuit recognizes its assigned address, the circuit is enabled to respond to a following command code which causes the circuit to assume the corresponding mode. In addition to the four codes for each of the four modes of the switching and testing circuit, there is a "master reset" code which allows all units, or all units within a group, to be returned to the in-data mode.

13 Claims, 6 Drawing Figures

DTMF ACTIVATED REMOTE TELEPHONE LINE SWITCHING AND TESTING

BACKGROUND OF THE INVENTION

The present invention generally relates to remote telephone switching and testing and, more particularly, to DTMF (dual-tone multi-frequency) activated apparatus which provides a customer who leases a private telephone line from a telephone company, or the telephone company itself, with a highly flexible and expandable circuit test capability.

In our prior U.S. Pat. No. 4,258,236, we disclosed a remote telephone line switching and testing circuit for a four-wire communication system providing communication between equipment at a first location and equipment of at least a second remote location. The switching and testing circuit is adapted to be connected to the receive pair of a four-wire telephone line at the remote location and includes a tone detecting circuit which is responsive to tones of a pre-determined frequency for providing output detection signals. A control circuit is responsive to those output detection signals to generate control signals.

According to one aspect of the invention disclosed in our prior patent, switching circuitry is provided which is responsive to a first control signal from the control circuit for disconnecting the equipment at the second location and providing quiet terminations for both the receive and transmit pairs of the four-wire line. This is the data-streaming dropout mode. The switching circuitry is further responsive to a second control signal from the control circuit and for re-establishing the connection between the equipment at the second location and the four-wire line.

According to another aspect of the invention disclosed in our prior patent, switching circuitry is provided which is responsive to a first control signal from the control circuit for disconnecting the equipment at the second location from both pairs of the four-wire line and connecting a milliwatt test signal source to the transmit pair. The switching circuitry is further responsive to a second control signal from the control circuit for disconnecting the milliwatt test signal source from the transmit pair and reconnecting the equipment at the second location to the four-wire line.

In the preferred embodiments of the invention disclosed in our prior patent, the control circuit is a sequencer circuit including a two-stage binary counter and decoding logic. In the first preferred embodiment, the counter counts three detection signals and is then automatically reset after a brief delay. On the first count output, the switching circuitry disconnects the equipment at the second location from the four-wire line and connects a loop-back amplifier between the receive pair and the transmit pair. On the second count output, the switching circuitry disconnects the loop-back amplifier and provides quiet termination for each of the receive and transmit pairs. On the third count output, the loop-back amplifier is briefly reconnected between the receive pair and the transmit pair to provide a brief tone pulse, and thereafter the loop-back amplifier is disconnected and the equipment at the second location is reconnected to the four-wire line. At this time, the counter is reset to be ready for the next cycle of switching and testing.

In the second preferred embodiment of the invention disclosed in our prior patent, the counter counts four detection signals, and since this count results in both stages of the counter being in their initial states, there is no need to provide a reset for the counter. On the first count output, the switching circuitry disconnects the equipment at the second location from the four-wire line and connects a loop-back amplifier between the receive pair and the transmit pair. On the second count output, the switching circuitry disconnects the loop-back amplifier and provides quiet terminations for each of the receive and transmit pairs. On the third count output, a milliwatt test signal source is connected to the transmit pair. On the fourth count output, the milliwatt test signal source is disconnected and the connection of the equipment at the second location to the four-wire line is re-established.

In the case where the second location includes a plurality of modems, the invention of our prior patent provides a separate switching and testing circuit for each modem. Each switching and testing circuit is assigned a different pre-determined tone frequency to which only its tone detecting circuit is responsive. With this arrangement, it is possible to separately address each switching and testing circuit to provide a multi-point testing capability. The tone generator to which the tone detecting circuit is responsive can be at any convenient location referred to simply as the first location, and if multi-point capability is provided, the tone generator is a multi-tone generator with any one of a pre-determined number of tone frequencies being selectable. In actual practice, the multi-tone generator produces frequencies between 300 Hz and 3 KHz in intervals of 100 Hz resulting in a total of thirty tones, and hence modems, which may be selected. This is usually entirely adequate in the case where a single remote customer premise includes a plurality of data collecting and/or processing equipment which are connected by means of modems to the telephone line, and often adequate in the case where switching and testing circuits are to be located at a plurality of remote customer premises. However, in this latter case, there are a number of applications, such as banking applications, for example, where the number of branch banks connected to a central bank by telephone line may be several hundred. In such applications, the multi-tone generator is not adequate to address the number of remote switching and testing circuits.

SUMMARY OF THE INVENTION

It is therefore an object of this invention to provide an improvement in our remote telephone line switching and testing circuit which will permit addressing and activating any one of a very large number of switching and testing circuits.

It is another object of the invention to provide such an improvement in our remote telephone line switching and testing circuit without a substantial increase in the complexity of the circuitry.

It is a further object of the present invention to provide such improvements in our remote telephone line switching and testing circuit which additionally provides individual command codes for each mode thereby allowing greater flexibility of operation and providing instant restoration of service.

The foregoing and other objects of this invention are accomplished by using a standard twelve button or expanded sixteen button telephone DTMF key pad instead of the aforementioned multi-tone generator.

Each remote switching and testing circuit is provided with a DTMF detector and digital logic responsive to the detector for recognizing an assigned address code and any one of the command codes corresponding to the looped mode, the terminated mode, the milliwatt source mode, and the in-data mode. A programmable three digit address, for example, allows use of up to one-thousand switching and testing circuits on one line. When the digital logic of a switching and testing circuit recognizes its assigned address, the circuit is enabled to respond to a following command code which causes the circuit to assume the corresponding mode. In addition to the four codes for each of the four modes of the switching and testing circuit, there is a "master reset" code which allows all units, or all units within a group, to be returned to the in-data mode. This serves as a "panic-button" in the event that the operator loses track of the location of activated units. Moreover, the address and command key sequence use the "#" and "*" keys of the twelve button or sixteen button DTMF key pad to guard against inadvertent operation.

BRIEF DESCRIPTION OF THE DRAWINGS

The specific nature of the invention, as well as other object, aspects, uses and advantages thereof, will clearly appear from the following description and from the accompanying drawings, in which.

DESCRIPTION OF THE PREFERRED EMBODIMENT

Figure 1:
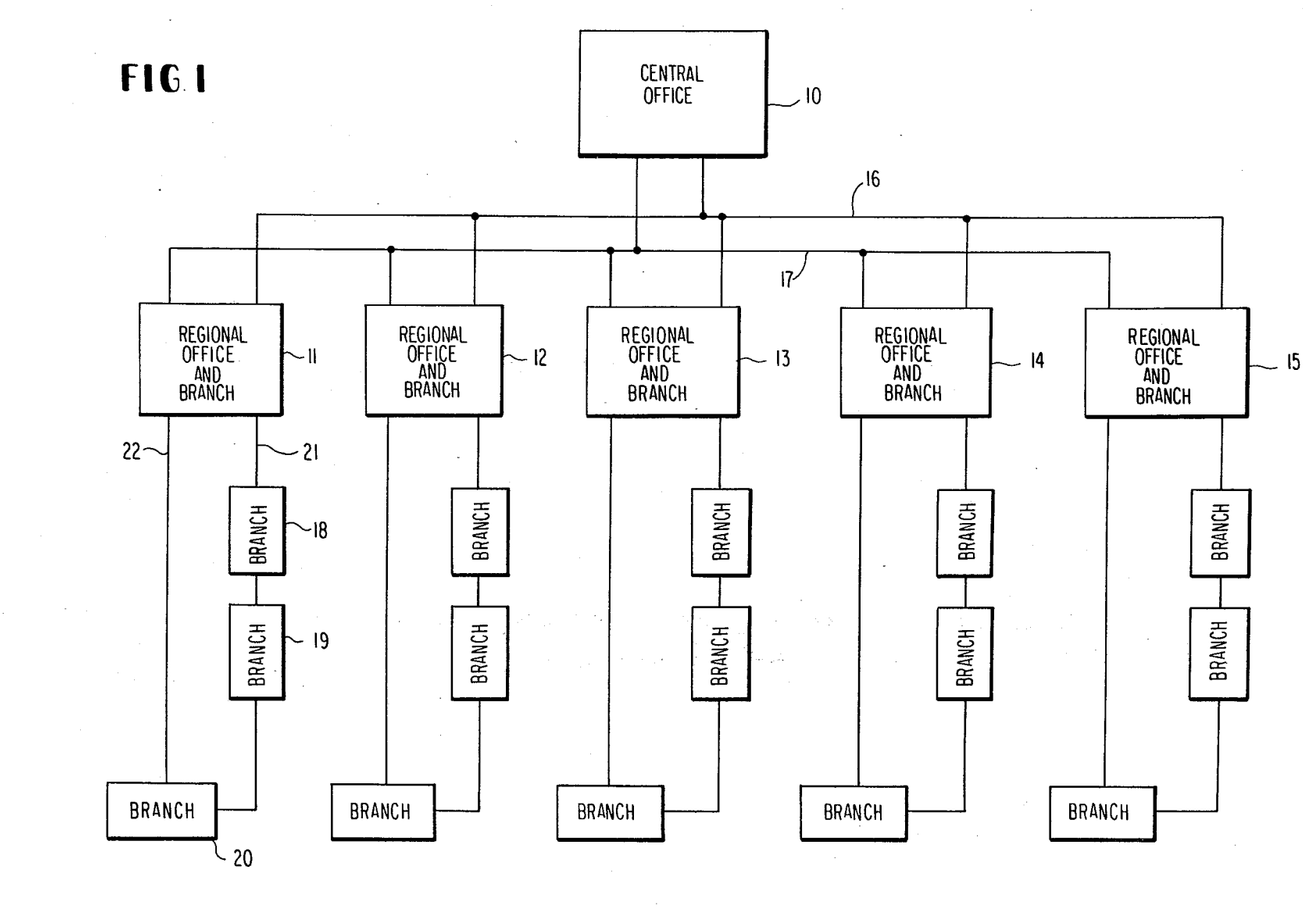
FIG. 1 is a generalized diagram of a complex data communications network.

Banking systems, which have shown tremendous growth in the recent past, are in example of a complex data communications network. FIG. 1 is a generalized diagram of a typical banking system. Such a system might include a central office 10 and several regional offices and branch banks 11 through 15. In the terminology of our prior patent, the central office would be the first location, and the regional offices would be the second remote locations. Communication between the central office and each of the regional offices is by way of a four-wire telephone line here represented by the two wires 16 and 17. For example, the wire 16 may be the transmit pair from the central office 10 which, of course, means that it is the receive pair for each of the regional offices 11 through 15. In like manner, wire 17 would be the receive pair for the central office 10 and, therefore, the transmit pair for each of the regional offices 11 through 15. Each of the regional offices in turn communicates with a plurality of branch banks in its particular geographical area. Taking the regional office 11 as exemplary, this office communicates with branch banks 18, 19 and 20. As shown in FIG. 1, these branch banks are connected for communication with the regional office in a two-wire continuous loop system which simulates a four-wire system. More particularly, the wire 21 represents a two-wire transmit pair and wire 22 represents a two-wire receive pair. The two wire continuous loop system is often implemented for purposes of economy. However, it does present a problem in that if any one of the branch banks line equipment in the loop system is down, the entire loop system is put out of operation.

Figure 2:
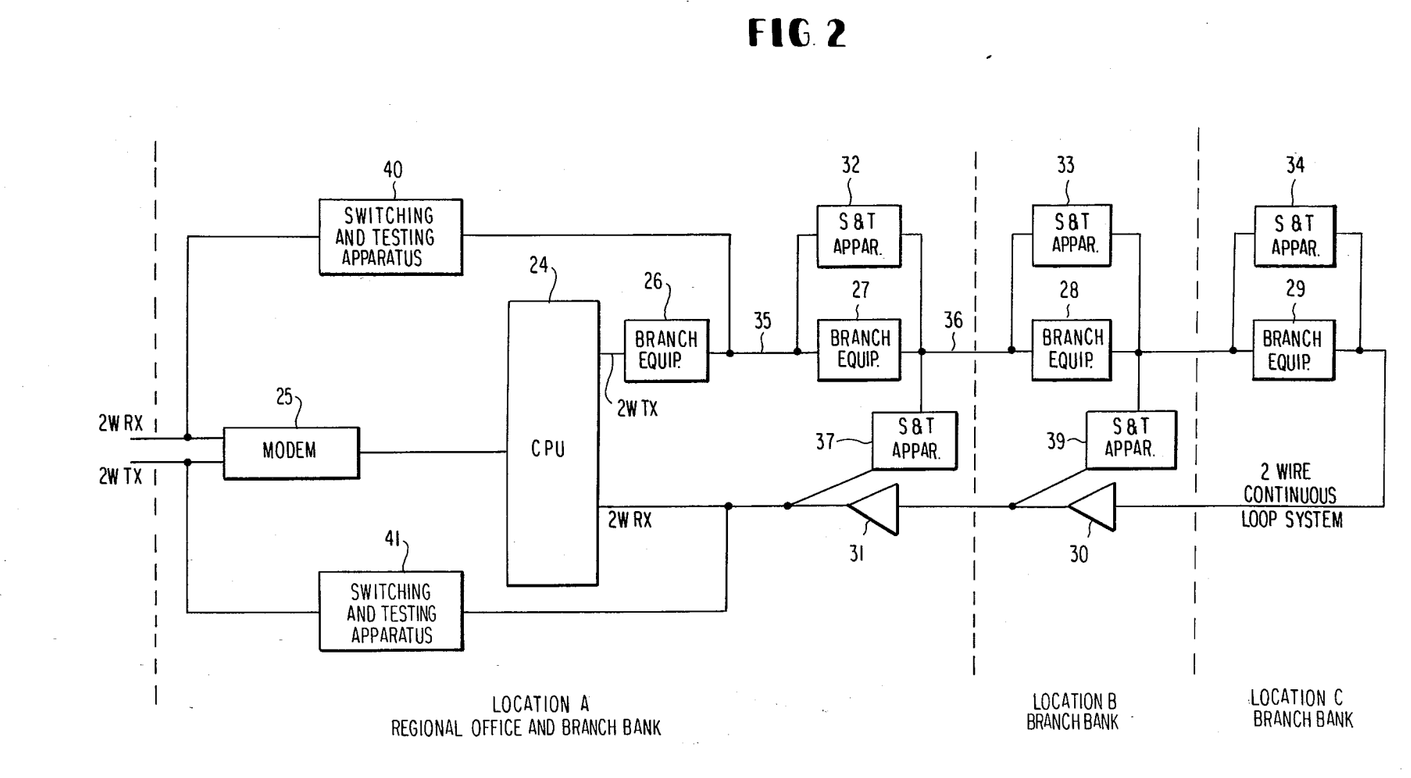
FIG. 2 is a detail from FIG. 1 showing a loop system.

FIG. 2 is a detail from FIG. 1 as showing one regional office and several branch banks interconnected in the two-wire loop system. More particularly, the regional office and branch bank is located at location A, and at this location, there may be a central processing unit which is connected to the four-wire telephone line from the central office by a modem 25. Also at location A there may be branch equipments 26 and 27 which could be automatic teller machines or various input-/output equipments for the data processing system. At locations B and C remote from location E are other branch banks. Each of these branch banks, in turn, are provided with branch equipments 28 and 29 which are connected in the two-wire continuous loop with the branch equipments 26 and 27. The two-wire continuous loop is completed by telephone company amplifiers 30 and 31 which return the loop to the central processing unit 24.

FIG. 2 also illustrates the manner in which the switching and testing apparatus according to the invention in our prior patent and this invention may be utilized. For example, it is desireable to be able to test the line equipment to and from each of the branch equipments, and this is accomplished with the switching and testing apparatus 32, 33 and 34 connected in parallel with the branch equipments 27, 28 and 29, respectively. As previously mentioned, this two-wire continuous loop system simulates a four-wire system. Thus, if line 35 is considered as a two-wire transmit pair from the central processing unit 24, then this wire would be connected as the two-wire receive pair to the switching and testing apparatus 32. In like manner, the switching and testing apparatus 32 would be connected to line 36 as the two-wire transmit pair. Already it will be observed that by providing the switching and testing apparatus in parallel with each of the branch equipments, the problem previously mentioned with respect to a branch equipment going down putting the two-wire continuous loop system out of order is overcome. More specifically, by placing the switching and testing apparatus 32, for example, in a loop-back mode, the branch equipment 27 is effectively bypassed since the loop-back amplifier will provide a direct connection between receive pair 35 and transmit pair 36. It should now be immediately apparent that the possibility for bypassing equipment can be taken a step further. Specifically, by providing switching and testing apparatus 37 and 39, a greater or lesser portion of the two-wire continuous loop system may be bypassed. Also as shown in FIG. 2, further switching and testing apparatus 40 and 41 are provided around the central processing unit 24, modem 25 and branch equipment 26.

Obviously, there are many points within a data communication system that the switching and testing apparatus of our inventions may be connected. However, it is easy to see that in a system like that shown in FIG. 1 more than thirty switching and testing apparatus (the approximate practical maximum number which can be individually addressed according to the invention of our prior patent) could be used. The present invention, which is described in detail hereinbelow, overcomes this problem by a very large number (theoretically an unlimited number) of switching and testing apparatus to be individually addressed. Moreover, the several modes of operation, i.e. loop-back, quiet termination, milliwatt signal source, and in-data, may now be individually addressed rather than sequentially addressed as in the invention of our prior patent. This allows a much greater flexibility in operation and promotes greater speed in the testing procedures.

Figure 3:
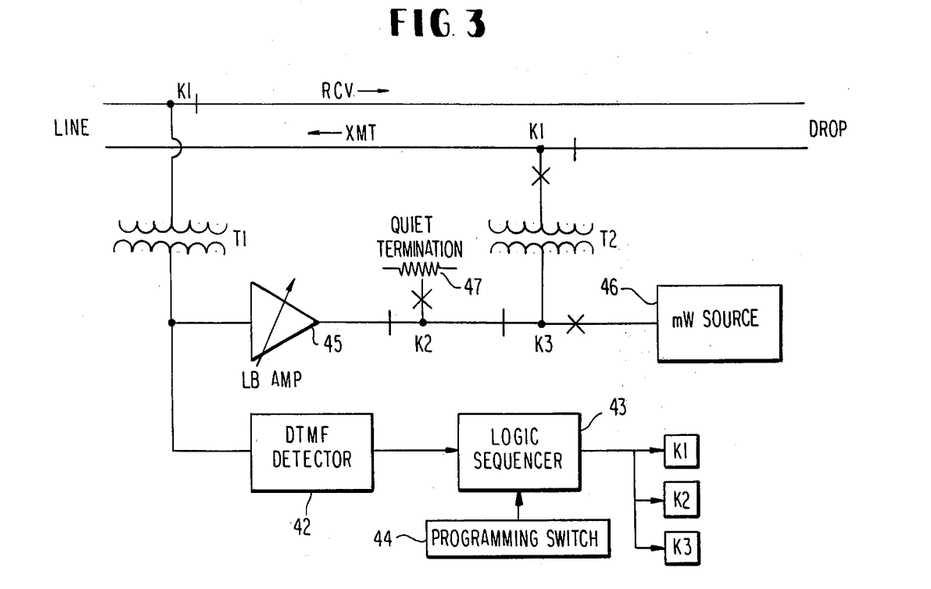
FIG. 3 is a block diagram of the DTMF activated switching and testing apparatus according to the present invention.

FIG. 3 shows the DTMF actuated switching and testing apparatus according to the invention in generalized block diagram form. The input of the switching and testing apparatus is connected to the two-wire receive pair by means of a transformer T1 which provides an output to the DTMF detector 42. The DTMF detector 42 comprises a DTMF filter and decoder which recognizes any one of the DTMF tones produced by the standard twelve button or expanded sixteen button key pad. The decoded outputs from the DTMF detector 42 are supplied to a logic sequencer 43. A programming switch 44 provides an input to the logic sequencer 43 so that the address code and the "master reset" code assigned to this particular switching and testing apparatus is recognized. If the address code is recognized, then the logic sequencer 43 will respond to any one of several command codes to energize one or a combination of the relays K1, K2 and K3. For example, if it is desired to place the apparatus in the loop-back mode, then the relay K1 is energized. As a result, the normally closed relay K1 contacts are opened so that the two-wire receive pair and the two-wire transmit pair are opened, and transformer T2 is connected to the two-wire transmit pair. Thus, the two-wire receive pair are coupled through transformer T1 through loop-back amplifier 45 and transformer T2 to the two-wire transmit pair. If instead of the loop-back mode, the milliwatt signal source mode is desired, then both of relays K1 and K3 are energized. As a result, the milliwatt signal source 46 is connected through transformer T2 to the two-wire transmit pair. On the other hand, if the quiet termination mode is desired, the relays K1 and K2 are energized so that the quiet termination 47 is connected through transformer T2 to the two-wire transmit pair. Obviously, de-energization of all three relays K1, K2 and K3 results in the switching and testing apparatus being placed in its passive or in-data state.

Figure 4:
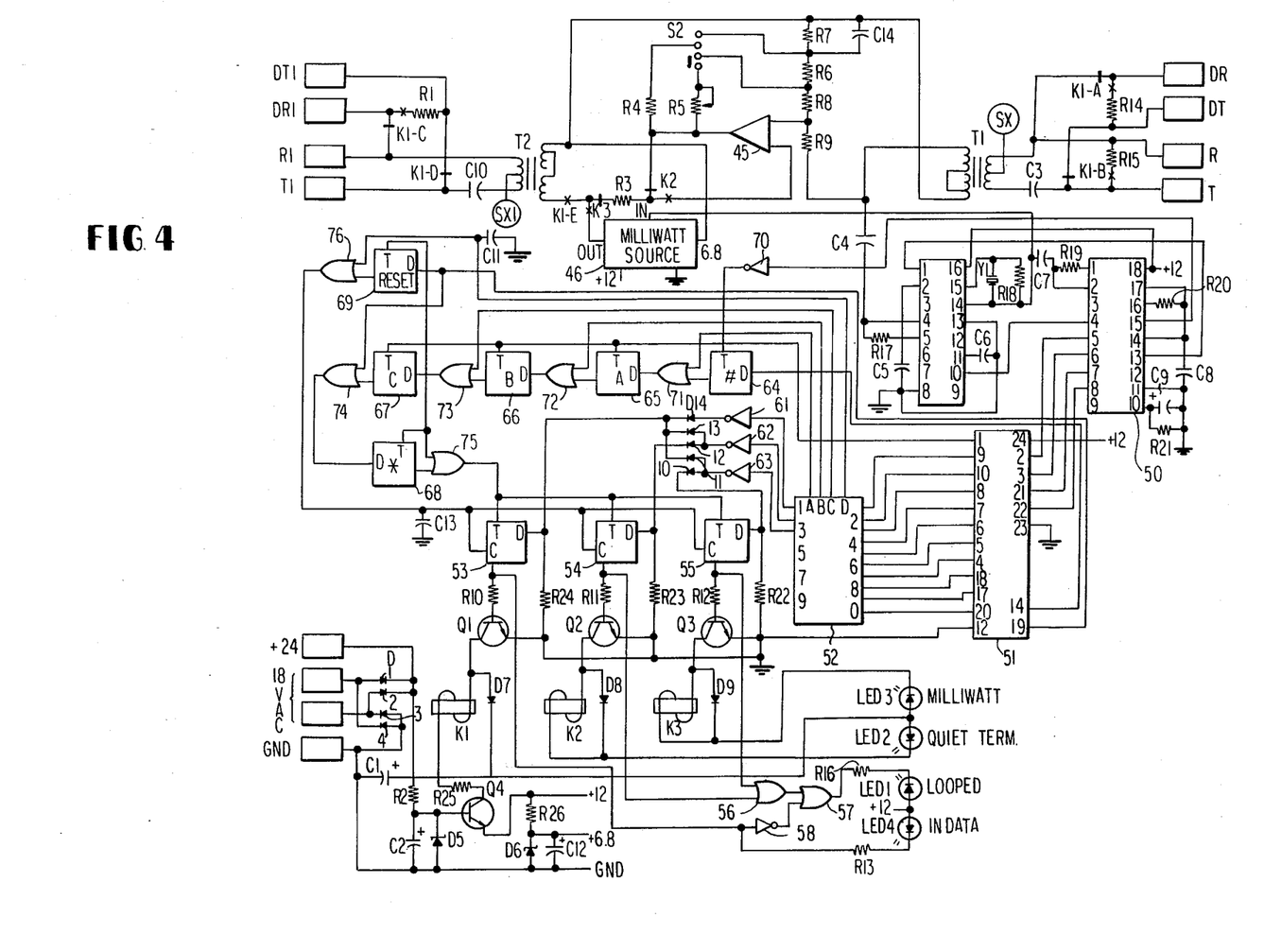
FIG. 4 is a detailed block and logic diagram of the DTMF activated switching and testing apparatus shown in FIG. 3.

FIG. 4 shows in some considerable detail an actual implementation of the DTMF switching and testing apparatus shown in FIG. 3. The receive signal is brought in through the R and T terminals and passed by relay contacts K1A and K1B to the DR and DT terminals. The transmitted signal is brought in through the DR1 and DT1 terminals and passed by relay contacts K1C and K1D to the R1 and T1 terminals.

The receive channel is bridged by transformer T1 in series with capacitor C3 to couple the receive signal into the loop back amplifier 45 and through coupling capacitor C4 to the DTMF filter 48. The DTMF filter 48 is a commercially available integrated circuit (IC) one example of which is manufactured by MITEL under Part No. MT8865AC. When the switching and testing apparatus is put into the loop-back mode, the output from loop-back amplifier 45 is coupled through transformer T2 and coupling capacitor C10 onto the transmit pair R1 and T1. This is accomplished by the closure of relay contacts K1E between transformer T2 and the loop-back amplifier 45.

Transformers T1 and T2 are always bridged across the transmit and receive wires, respectively, in any mode, for the possibility of simplex DC operation of the switching and testing apparatus. When this is desired, capacitors C3 and C10 are bypassed by points SX and SX1, which are the center taps of the telephone company lines sides of transformers T1 and T2, respectively, and which are tied into a power supply modification which utilizes the DC appearing on the receive and transmit telephone company lines to power the entire circuit. For normal operation, capacitors C3 and C10 are included to block any signalling DC which may appear on the telephone company lines.

When the switching and testing apparatus is in any mode other than the in-data mode, relay K1 is operated. Contacts K1A, K1B, K1C, and K1D all open to disconnect the telephone company lines from the drop connections. Contacts K1A and K1C also serve to connect 600 ohm terminating resistors R14 and R1 to the drop connections in these modes. Contacts K1B connect a 600 ohm terminating resistor R15 to the receive telephone company line, and contacts K1E close to connect the output of the loop-back amplifier 45 through 600 ohm source resistor R3 to the transmit telephone company line. Thus, all four lines are properly terminated in the not-in-data modes.

For the quiet termination mode, relay K2 operates in conjunction with relay K1 as previously described. This disconnects resistor R3 from the output of the loop-back amplifier 45 and connects it to signal common. Resistor R3 then becomes a quiet termination applied to the transmit telephone company pair. For the milliwatt signal source mode, relay K3 operates in conjunction with relay K1. Relay K3 disconnects the loop-back amplifier 45 from transformer T2 and connects transformer T2 instead to the output of the milliwatt source module 46 through a 600 ohm source resistor in the milliwatt module. This applies the milliwatt signal (1,004 Hz 0 dBm) to the telephone company transmit line.

All receive signals are passed by capacitor C4 to the input of the DTMF filter 48. The DTMF filter 48 splits the incoming signals into two bands corresponding to the high-tone group and the low-tone group of the DTMF system. Whatever is received within the high-frequency range is amplified, limited and sent to the DTMF decoder 50 on it high-frequency input line pin 4. Any incoming signal that is in the low-frequency range is likewise amplified, limited and sent to the DTMF decoder 50 on its low-frequency input pin 13. The DTMF decoder is also a commercially available IC one example of which is manufactured by MITEL under Part No. MT8860AE.

Whenever the receive signal consists of a valid DTMF signal pair, the result is a single high-frequency and a single low-frequency received in DTMF decoder 50 simultaneously. When this occurs, the DTMF decoder 15 decodes the received pair into the proper binary coded version of the original digit pressed on the key pad. This information is latched in the DTMF decoder 50 and sent out on the four output lines, pins 5 through 8. A signal also appears on pin 15 at this time to indicate that a valid tone pair has been received. This signal is further processed to serve as a clocking signal for the various D-type flip-flops in the remainder of the circuit.

The time required by the DTMF decoder 50 to generate the valid tone received signal is determined by resistor R20 and capacitor C8. In the preferred embodiment, this has been set for approximately 200 milliseconds, meaning that the DTMF tone pair must be maintained for that period of time in order to be recognized. A longer duration would unnecessarily slow the operator pushing the keys, and a shorter duration allows a greater possibility of inadvertent operation from other sources.

The four binary coded decimal output lines from DTMF decoder 50 are sent to a one-of-sixteen decoder 51. The decoder 51 is also a commercially available IC one example of which is manufactured by RCA under Part No. CD4515. Output signals from the decoder 51 corresponding to the depression of keys 0 through 9 are applied by lines to corresponding inputs to a matrix switch 52. The outputs from the decoder 51 corresponding to the depression of the asterisk key (*) and the number sign key (#) are not applied to the matrix switch but are applied by corresponding lines to other portions of the logic circuitry.

The matrix switch assembly consists of four rocker switches. The first three switches S1A, S1B and S1C each have the ability to select one of the ten incoming lines and output that signal on the appropriate A, B or C line. These three switches are used to set the address combination of the particular switching and testing apparatus. The remaining switch S1D is used to select an output from lines corresponding to keys 5, 6, 7, 8, 9, or 0 to enable the master reset circuitry. These four rocker switches are all intended to be used by depressing no more than one rocker at a time on each switch.

The output signals from decoder 51 are low-true or negative logic. Thus, a 0 is represented by a voltage level near 12 volts, which is the power supply voltage driving the ICs, and a one-logic level is represented by voltage near 0. This negative logic is maintained from the output of the decoder 51 through the matrix switch 52 and through the various flip-flops and gates up to the point of clocking the three output registers or flip-flops 53, 54 and 55. These three flip-flops hold the information which drives the three output transistors Q1, Q2 and Q3, which drive the relays K1, K2 and K3, respectively.

The four operating modes require different combinations of these relays to be activated as described before are summarized as follows:
in-data: no relays operated
loop-back: relay K1 operated
quiet termination: relays K1 and K2 operated
milliwatt source: relays K1 and K3 operated Four light-emitting diodes LED1 through LED4 indicate whichever of the four modes is in operation. These LEDs are driven by combining the appropriate signals from the flip-flops 53, 54 and 55 using OR gates 56 and 57 and inverter 58.

The information clocked into flip-flops 53, 54 and 55 is obtained from corresponding lines connected to the matrix switch 52, which are actually the outputs corresponding to keys 1 through 3 from the decoder 51. Positive logic is needed here to drive the NPN transistors Q1 through Q3. Therefore, these three lines are all fed to inverters 61, 62 and 63. The outputs from these three inverters are combined by diodes D10 through D14 as follows: a key 1 output, representing loop-back, presents a high-level only to the flip-flop 53 driving transistor Q1. A key 2 output, representing quiet termination, provides a high-level to the flip-flops 53 and 54 driving transistors Q1 and Q2. A key 3 output, representing milliwatt source, provides a high-level to the flip-flops 53 and 55 driving the transistors Q1 and Q3. A key 4 output (or any other output) will provide no high-level information to any of the three flip-flops 53, 54 or 55, resulting in no relays being driven when the flip-flops are clocked. This will produce an in-data condition. Key 4 is the code assigned to produce this condition.

This information from keys 1, 2, 3, or 4 is always presented to the three output flip-flops whenever one of these keys is depressed. However, the information is used only if the output flip-flop are clocked. A clocking signal is produced only if the correct combination of addressing and command keys is hit in sequence. The six flip-flops 64 through 69 are all clocked by the valid-tone-received line from DTMF decoder 50, inverted by inverter 70.

Figure 6:
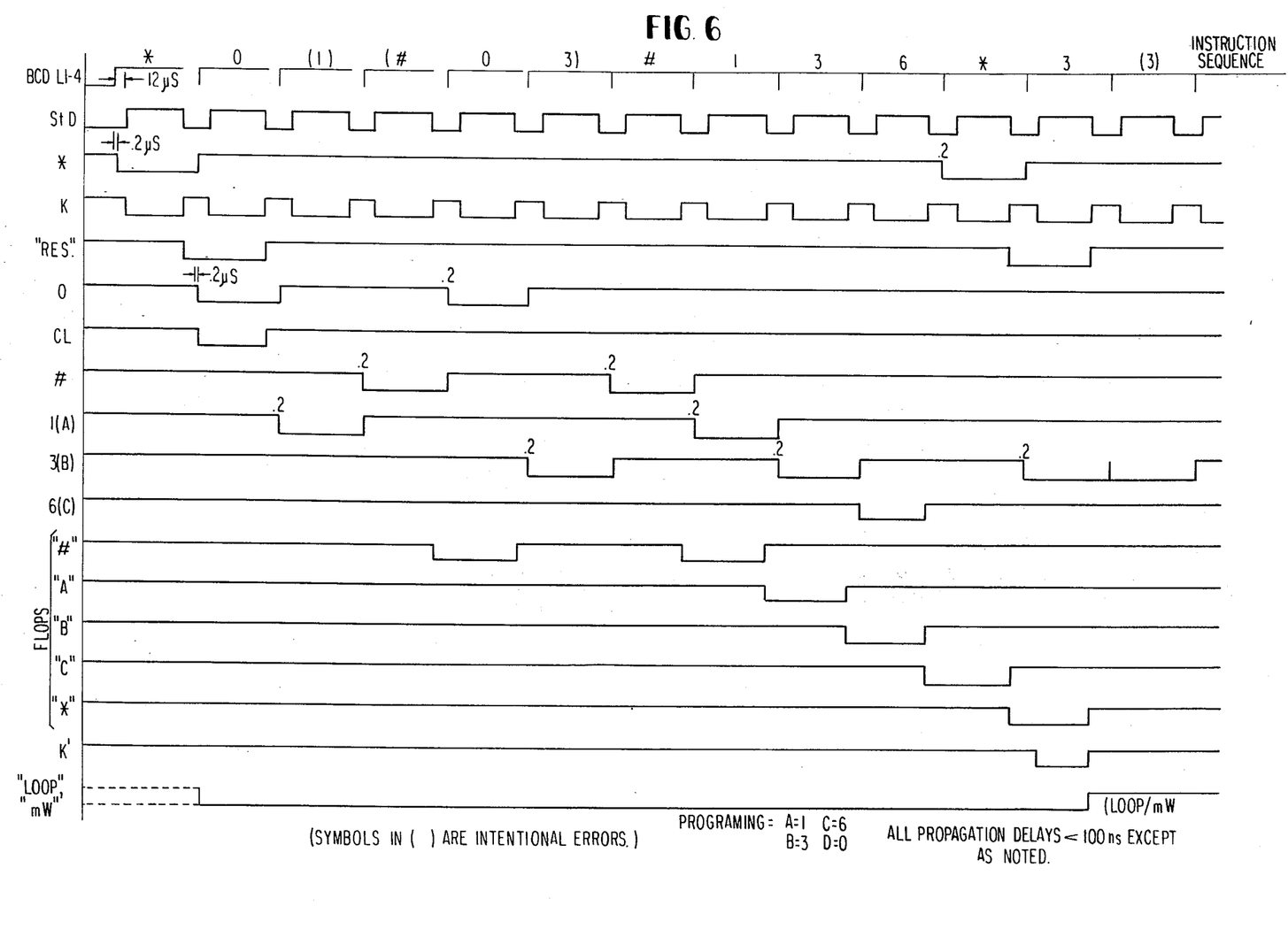
FIG. 6 is a timing diagram illustrating the operation of the apparatus as shown in FIG. 4.

In FIG. 6, the valid-tone-received pulse is shown as the STD pulse for delayed steering or delayed strobe. The inverted version is shown as K for clock. A progression of key depressions is shown along the top of the timing diagram. This progression is chosen to include valid commands as well as selected invalid commands, to show the results of each command on the timing diagram.

Referring back to FIG. 4 of the drawings, whenever the # key is depressed, a low-true signal appears on the D input of flip-flop 64, which is the # flip-flop or latch. The trailing edge of the K clock pulse, which is positive going, is applied to the T input of flip-flop 64 and clocks this information in to the flip-flop allowing it to appear on the complimentary output of the flip-flop which is applied to one input of OR gate 71. Since this is negative true logic, the OR gate actually functions as an AND gate, allowing a low output only when both of the inputs are low.

If the key is now depressed corresponding to the digit selected by the matrix switch S1A, the corresponding output from decoder 51 will be routed through switch S1A to the other input of OR gate 71. With both inputs of this gate low, the output will go low providing a low-true condition at the D input of flip-flop 65. This low-true condition will now be clocked into the flip-flop 65 by a clock pulse at the T input. This sequence proceeds through the other flip-flops 66 and 67 via OR gates 72 and 73 and finally clocking a low-true signal from OR gate 74 into the D input of flip-flop 68 if the * key is depressed.

To briefly summarize, if, for example, the three-digit address for this particular switching and testing apparatus is 612, then in order to correctly address this particular apparatus the sequence #, 6, 1, 2, * must be punched into the DTMF key pad. If this sequence has proceeded properly according to the three-digit address programmed into the matrix switch 52, then any following key depression will result in the clock pulse also being passed by OR gate 75 to the T inputs of flip-flops 53, 54 and 55. Thus, this following key depression will then have its information clocked into one or more of the flip-flops 53, 54 and 55. This information will then control the mode of the apparatus until another valid address and command sequence is received.

There is an additional logic path resulting in a change of mode allowing all of the switching and testing apparatus on one circuit or a selected group to be reset to in-data condition by a single command with no address required. This command is of the form "* digit", where the digit is that selected by the matrix switch S1D. This logic proceeds as follows: whenever the * key is depressed, it sets the reset flip-flop 69, with no address required, as well as setting the * flip-flop 69 if a valid address has been received. If an * is followed by the digit selected by S1D, which may be 5, 6, 7, 8, 9, or 0, the reset flip-flop output and the digit output combine in OR gate 76 to form a CLEAR signal. This signal causes all three output flip-flops 53, 54 and 55 to clear, thus producing an in-data condition by dropping out all relays. The digit selected by the switch S1D is therefore a combined command and address digit, since any of the switching and testing apparatus on a given circuit might have this switch set to one of the six possible positions. All units with a switch set to seven, for instance, will be reset to in-data by the depression of * followed by the numeral 7. The digits 1, 2, 3 and 4 are not allowed as reset codes since this would interfere with address commands.

If eighteen volt AC power is provided, it is brought into a rectifier bridge D1 through D4 and converted to approximately twenty-four volts DC across capacitor C1. Alternatively, twenty-four volts DC may be brought in directly to this point. The twenty-four volts is used by relays K1 through K3. It is also fed to a regulator circuit consisting of resistor R2, capacitor C2, diode D5 and transistor Q4, which produces a regulated twelve volts. This voltage is used to supply all of the logic circuits and is the positive supply for the loop-back amplifier 45. The twelve volts is further dropped to 6.8 volts DC, which is used as the signal common for the loop-back amplifier 45 and the milliwatt source 46. The point marked ground, or 0 volts, is the return for the logic circuitry and the negative supply for the loop-back amplifier and milliwatt source.

The circuitry is set up to provide the optimum response to power failures of various lengths. It is assumed that the ideal response to a short power failure consisting of anything up to several seconds, or perhaps a minute, would be no response at all; that is, the circuit would remain in operation exactly as it was left. For the in-data mode, since the relays are all in their normal position, a power failure of any length leaves the unit in-data and does not disturb normal operation.

For any other mode, a maintained power failure means loss of power to the relays, and it therefore is impossible to maintain a not-in-data mode indefinitely. However, the power supply filter is sufficient to maintain a not-in-data mode for about a half second; therefore, a transient power loss of up to a half second does not cause the relays to drop out or produce a low enough voltage anywhere to upset the logic.

For a power failure of greater than a half second but less than five to ten seconds, the relays drop out resulting in an in-data mode. However, enough voltage remains in the supply capacitor to maintain the memory in the logic circuitry of what mode the unit was in prior to the power failure. When power returns, this mode is re-established, thus resulting in a test sequence interruption of only the duration of the power failure, and not requiring any additional addressing or commands by the operator.

A power failure longer than ten seconds will reduce supply voltages to a level that might result in an unpredictable start-up configuration on return of power. For this reason, capacitor C13 is added to the output flip-flop clear line. The normally high voltage on capacitor C13 will decay to a point near 0 such that the return of power after a power failure longer than ten seconds will start the unit with a near 0 voltage on the clear line before capacitor C13 can be recharged. This will ensure that the output flip-flops 53, 54 and 55 are immediately cleared and that the unit starts in an in-data condition. If a testing sequence has been interrupted by a long power failure, it is assumed that when power returns the operator will have recognized the power failure, waited for its return, and accept the requirement of having to re-establish the mode under which he was operating.

Figure 5:
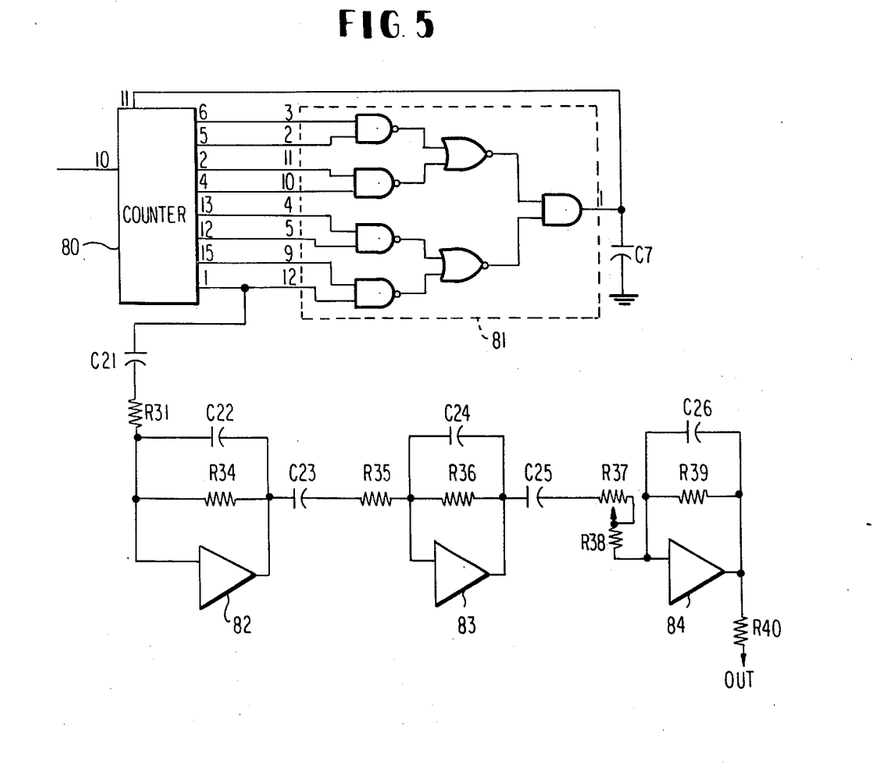
FIG. 5 is a block and schematic diagram of the milliwatt signal source used in the apparatus shown in FIG. 4.

The milliwatt signal source module is shown in detail in FIG. 5. The milliwatt signal source module uses the 3.579 MHz signal generated by the DTMF filter 48. This signal is brought into a twelve stage binary counter 80 which acts as a frequency divider. This counter produces an increasing binary count on its output lines until the eight-input AND gate 81 detects the binary equivalent of 3564. At this point, the output of AND gate 81 goes high and resets counter 80 to 0. Thus, the counter 80 and the AND gate 81 act to divide the incoming frequency by 3564 resulting in a nominal 1,004.36 Hz output signal.

The 1,004 Hz signal from counter 80, which is a square wave, is then sent through capacitor C21 to a series of three integrators comprising operational amplifiers 82, 83 and 84, which act as a low pass filter to convert the square wave to a sinusoidal wave. The last integrator comprising operational amplifier 84 has a potentiometer R37 in series with its input to allow the output level to be set. This is necessary to compensate for tolerances of several components in the integrators. Each integrator consists of one of the operational amplifiers, an input resistor R31, R35 or R38 and a feedback capacitor C22, C24 or C26, respectively. An input DC-blocking capacitor C21, C23 or C25 is used for each integrator. In addition, a large feedback resistor R34, R36 or R39 is used to stabilize the respective operational amplifier. The output from the operational amplifier 84 is taken through a 600 ohm resistor R40 and used by relay K3 for the milliwatt source mode.

While a specific preferred embodiment has been disclosed, those skilled in the art will recognize that the invention may be practiced with various modifications. For example, while a three-digit address code has been used providing up to one thousand addresses, a four-digit address code or even a larger address code could be used to provide still more addresses. Also, while certain commerically available ICs have been specifically mentioned, other equivalent circuits could be used. Therefore, it will be understood that the preferred embodiment is presented herein by way of example only, and other variations and modifications of the invention may be practiced within the scope of the appended claims.

We claim:

1. In a four-wire communication system of the type wherein two wires are used for transmission and two wires are used for reception, said system providing communication between equipment at a first location and equipment at a plurality of second remote locations, the improvement comprising:
   a DTMF key pad connected to the two wires for transmission at said first location for use in generating DTMF signals corresponding to one of a plurality of address codes and at least one of a plurality of command codes; and
   an improved switching and testing circuit at each of said plurality of second remote locations, said improved switching and testing circuit comprising:

a DTMF detector connected to the two wires for reception at one of said second remote locations and responsive to DTMF signals for providing output detection signals;

logic means responsive to the output detection signals of said DTMF detector for recognizing one of said plurality of address codes and any one of said plurality of command codes, said logic means providing an enabling output upon recognition of said one address code, said enabling output permitting the generation of one of a plurality of control outputs corresponding to the recognition of one of said command codes;

a loop-back amplifier; and switching means responsive to one of said control outputs for disconnecting the equipment at said second location from the four-wire line and connecting said loop-back amplifier between the two wires used for reception and the two wires used for transmission, said switching means being responsive to a different one of said control outputs for providing a quiet termination for each of the two wires used for reception and the two wires used for transmission, said switching means further being responsive to still another one of said control outputs for reestablishing the connection of the equipment at said second location to the four-wire line.

2. In the four-wire communication system recited in claim 1 wherein the improved switching and testing circuit further comprises a milliwatt test signal source, said switching means being responsive to yet another one of said control outputs for disconnecting the equipment at said second location from the four-wire line and connecting said milliwatt test signal source to said two wires for transmission.

3. In the four-wire communication system as recited in claim 1 wherein said logic means in said improved switching and testing circuit is responsive to the output detection signals of said DTMF detector for recognizing a master reset code, said logic means providing a clear output upon recognition of said master reset code, said switching means being responsive to said clear output for re-establishing the connection of the equipment at said second location to said four-wire line.

4. In the four-wire communication system as recited in claim 1 wherein the logic means of said improved switching and testing circuit comprises:

decoder means responsive to output detection signals from said DTMF detector for providing one of a plurality of possible outputs corresponding to a key depressed in said DTMF key pad;

programming means for storing a predetermined multi-digit address assigned to the improved switching and testing circuit;

gating means connected to said programming means and responsive to the outputs of said decoder means for comparing a sequence of outputs of the decoder with said predetermined multi-digit address and producing said enabling output when the sequence of outputs of the decoder are the same as said predetermined multi-digit address; and latch means enabled by said enabling output and responsive to a further output from said decoder means to produce one of said control outputs.

5. In the four-wire communication system as recited in claim 4 wherein said programming means further stores a predetermined master reset code and said gating means compares the output of said decoder means with said predetermined master reset code to produce a clear output, said latch means being cleared by said clear output.

6. A remote telephone line switching and testing circuit for a four-wire communication system of the type wherein two wires are used for transmission and two wires are used for reception, said system providing communication between equipment at a first location and equipment at at least a second remote location, said remote telephone line switching and testing circuit comprising:

DTMF detecting and control means adapted to be connected to the two wires used for reception at said second remote location and responsive to tones of predetermined frequencies for providing first and second control signals in response to corresponding DTMF signals; and switching means responsive to said first control signal for disconnecting the equipment at said second location from the four-wire line and providing a quiet termination for each of the two wires used for reception and the two wires used for transmission which are disconnected from said equipment, said switching means further being responsive to said second control signal for reconnecting the equipment at said second location to the four-wire line.

7. A remote telephone line switching and testing circuit as claimed in claim 6 further including a loop-back amplifier; and wherein the DTMF detecting and control means generates a third control signal in response to a corresponding DTMF signal, and the switching means is responsive to the third control signal for connecting the loop-back amplifier between the two wires used for reception and the two wires used for transmission.

8. A remote telephone line switching and testing circuit as claimed in claim 7 further including a milliwatt test signal source; and wherein the DTMF detecting and control means generates a fourth control signal in response to a corresponding DTMF signal, and the switching means is responsive to the fourth control signal for connecting the milliwatt test signal source to the two wires for transmission.

9. A remote telephone line switching and testing circuit for a four-wire communication system of the type wherein two wires are used for transmission and two wires are used for reception, said system providing communication between equipment at a first location and equipment at at least a second remote location, said remote telephone line switching and testing circuit comprising:

DTMF detecting and control means adapted to be connected to the two wires used for reception at said second remote location and responsive to tones of predetermined frequencies for providing first and second control signals in response to corresponding DTMF signals;

a milliwatt test signal source, and switching means responsive to said first control signal for disconnecting the equipment at said second location from at least the two wires used for transmission and connecting said milliwatt test signal source to said two wires used for transmission, said switching means further being responsive to said second control signal for disconnecting said milliwatt test signal source from said two wires and reconnecting the equipment at said second location to said two wires used for transmission.

10. In a four-wire communication system of the type wherein two wires are used for transmission and two wires are used for reception, said system providing communication between equipment at a first location and equipment at at least a second remote location, the improvement comprising:

a DTMF key pad connected to the two wires used for transmission at said first location; and a switching and testing circuit at said at least second remote location, said switching and testing circuit comprising:

DTMF detecting and control means connected to the two wires used for reception at said second remote location and responsive to tones of predetermined frequencies for providing first and second control signals in response to corresponding DTMF signals; and switching means responsive to said first control signal for disconnecting the equipment at said second location from the four-wire line and providing a quiet termination for each of the two wires used for reception and the two wires used for transmission which are disconnected from said equipment, said switching means further being responsive to said second control signal for reconnecting the equipment at said second location to the four-wire line.

11. In a four-wire communication system, the improvement as claimed in claim 10 further including a loopback amplifier; and wherein the DTMF detecting and control means generates a third control signal in response to corresponding DTMF signal, and the switching means is responsive to the third control signal for connecting the loop-back amplifier between the two wires used for reception and the two wires used for transmission.

12. In a four-wire communication system, the improvement as claimed in claim 11 further including a milliwatt test signal source; and wherein the DTMF detecting and control means generates a fourth control signal in response to a corresponding DTMF signal, and the switching means is responsive to the fourth control signal for connecting the milliwatt test signal source to the two wires for transmission.

13. In a four-wire communication system of the type wherein two wires are used for transmission and two wires are used for reception, said system providing communication between equipment at a first location and equipment at at least a second remote location, the improvement comprising:

a DTMF key pad connected to the two wires for transmission at said first location for generating tones of predetermined frequencies; and a switching and testing circuit at said at least second remote location, said switching and testing circuit comprising:

DTMF detecting and control means connected to the two wires used for reception at said second remote location and responsive to tones of said predetermined frequencies for providing first and second control signals in response to corresponding DTMF signals;

a milliwatt test signal source; and switching means responsive to said first control signal for disconnecting the equipment at said second location from at least the two wires used for transmission and connecting said milliwatt test signal source to said two wires used for transmission, said switching means further being responsive to said second control signal for disconnecting said milliwatt test signal source and reconnecting the equipment at said second location to said two wires used for transmission.

* * * * *